(12) United States Patent
Santry (10) Patent No.: US 10,158,710 B2
(45) Date of Patent: *Dec. 18, 2018

(54) EFFICIENT REPLICATION OF CHANGES TO A BYTE-ADDRESSABLE PERSISTENT MEMORY OVER A NETWORK

(71) Applicant: NetApp, Inc., Sunnyvale, CA (US)

(72) Inventor: Douglas Joseph Santry, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 14/928,892

(22) Filed: Oct. 30, 2015

(65) Prior Publication Data
US 2016/0050275 A1    Feb. 18, 2016

Related U.S. Application Data (63) Continuation of application No. 13/901,201, filed on May 23, 2013, now Pat. No. 9,201,609.

(51) Int. Cl.
*G06F 12/00* (2006.01)
*H04L 29/08* (2006.01)
(Continued)

(52) U.S. Cl.
CPC .......... *H04L 67/1095* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS

| 7,908,255 B2 | 3/2011 | Detlefs et al. |
| 2007/0130232 A1 | 6/2007 | Therrien et al. |

(Continued)

OTHER PUBLICATIONS

Welsh, Paging: inside the OS, CS 241, Feb 8, 2012. Published by the University of Illinois at https://courses.engr.illinois.edu/cs241/sp2012/lectures/10-paging.pdf.*

(Continued)

*Primary Examiner* — Prasith Thammavong
*Assistant Examiner* — Jason W Blust
(74) *Attorney, Agent, or Firm* — Cesari and McKenna, LLP (57) ABSTRACT

A system and method for efficiently replicating data stored in a byte-addressable, persistent memory of a host computer. A user-level library of the host computer may configure the persistent memory as a software transactional memory (STM) system defined by operations, such as a STM commit operation, that ensure safe and consistent storage of the data within a region of the persistent memory. The library may then cooperate with an application executing on the host computer to control access to the data, e.g., to change the data, as a transaction using the STM commit operation. Within a context of the transaction, the library may precisely determine which bytes of the data have changed within the region, as well as how and when the data bytes have changed. Armed with precise knowledge of the context of the transaction, the library may efficiently replicate the changed data at the byte-addressable granularity.

20 Claims, 5 Drawing Sheets

(51) Int. Cl.
- *G06F 3/06* (2006.01)
- *G06F 11/14* (2006.01)
- *G06F 11/20* (2006.01)
- *G06F 17/30* (2006.01)

(52) U.S. Cl.
CPC ........ *G06F 3/0619* (2013.01); *G06F 11/1464* (2013.01); *G06F 11/1474* (2013.01); *G06F 11/20* (2013.01); *G06F 11/2097* (2013.01); *G06F 17/30371* (2013.01); *H04L 67/1097* (2013.01)

(56) References Cited

U.S. PATENT DOCUMENTS

| | | |
|---|---|---|
| 2008/0005332 A1 | 1/2008 | Pande et al. |
| 2008/0168303 A1 | 7/2008 | Spear et al. |
| 2012/0096052 A1 | 4/2012 | Tolia et al. |
| 2012/0191941 A1 | 7/2012 | Naganuma et al. |
| 2014/0244949 A1 | 8/2014 | Abali et al. |

OTHER PUBLICATIONS

C. Wright et al., Extending ACID Semantics to the File System, ACM Transactions on Storage, vol. 3, No. 2, pp. 1-40, May 2007 (40 Pages).

A. Bender et al., Cache-Oblivious Streaming B-Trees, SPAA '07 Proceedings of the nineteenth annual ACM symposium on Parallel algorithms and architectures, pp. 81-92, 2007 (12 Pages).

J. Condit et al., Better I/O Through Byte-Addressable, Persistent Memory, SOSP '09 Proceedings of the ACM SIGOPS 22nd symposium on Operating systems principles, pp. 133-146 (14 Pages).

\* cited by examiner

EFFICIENT REPLICATION OF CHANGES TO A BYTE-ADDRESSABLE PERSISTENT MEMORY OVER A NETWORK

CROSS-REFERENCE TO RELATED APPLICATIONS

The present application is a continuation of U.S. patent application Ser. No. 13/901,201, entitled Efficient Replication of Changes to a Byte-Addressable Persistent Memory Over a Network, filed on May 23, 2013 by Douglas Joseph Santry, which application is hereby incorporated by reference.

BACKGROUND

Technical Field

The present disclosure relates to replication of data and, more specifically, to efficient replication of data in a network environment having a host computer with byte-addressable persistent memory.

Background Information

Many modern computing algorithms are page-based and implemented in a kernel of an operating system executing on a host computer. Paging is a memory management function that facilitates storage and retrieval of data in blocks or "pages" to and from primary storage, such as disks. For example, assume that a page contains 4 k bytes of data. An application executing on the host computer may utilize a page-based algorithm to, e.g., insert a new node into a doubly-linked list. Execution of the algorithm may result in a first modified ("dirtied") page, i.e., the page with a previous pointer, a second dirtied page, i.e., the page with a next pointer, and a third dirtied page containing the newly written node. Accordingly, execution of the page-based node insertion algorithm results in three (3) dirty pages or 12 k bytes of data.

The advent of byte-addressable persistent memory, such as storage class memory, may accelerate adoption of primary storage to reside on a memory bus of the host computer, as well as acceptance of "in-memory" computing. The persistent memory may be configured to enable applications executing on the host computer to safely and consistently modify (change) their data at a byte addressable granularity to, e.g., survive failures. For instance, execution of the node insertion algorithm at a byte-addressable granularity results in approximately 50 bytes of changed data. Yet, even safe and consistent data stored in the persistent memory may be vulnerable in the event of a disaster because there is only a single copy of the data on the host computer.

Therefore, there is a need to replicate the changed data, e.g., to one or more remote machines connected to the host computer over a network to thereby allow recovery from a disaster. However, in order to replicate, for example, the changed data of the page-based node insertion algorithm to a remote machine, the kernel is forced to copy 12 k bytes of data over the network. This approach is clearly inefficient for changes to data in byte-addressable persistent memory of a network environment.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

The embodiments described herein provide a system and method for efficiently replicating data in a network environment having a host computer with byte-addressable persistent memory. A user-level library of the host computer may configure the persistent memory as a software transactional memory (STM) system defined by operations, such as a STM commit operation, that ensure safe and consistent storage of the data within a region of the persistent memory. The library may then cooperate with an application executing on the host computer to control access to the data, e.g., to change the data, stored in the region of the persistent memory as a transaction using the STM commit operation. Within a context of the transaction, the library may precisely determine which bytes of the data have changed within the region, as well as how and when the data bytes have changed. Armed with precise knowledge of the context of the transaction, the library may efficiently replicate (i.e., copy) the changed data at the granularity at which it was modified, e.g., at the byte-addressable granularity.

In one or more embodiments, the library may initiate replication of the data by forwarding the changed data to a network adapter of the host computer as one or more splinters associated with the transaction. Illustratively, a splinter may contain information such as a starting or base memory address of the changed data within the region, a length of the changed data and a string of bytes of the changed data. The network adapter may thereafter forward each splinter over the computer network, e.g., within one or more frames, to one of a plurality of remote storage servers having storage devices, such as disks, organized as a replication group for the region. As described herein, the information contained with the splinter of the transaction may be stored on a disk of the replication group using either a synchronous or asynchronous mode of replication.

In one or more embodiments, selection of the disk to store the splinter may be determined in accordance with an equivalence class technique. Illustratively, the equivalence class technique may logically apportion an address space of the region, as defined by a multi-bit memory address, into a number of equivalence classes defined by a predetermined number of high bits of the multi-bit memory address. In addition, each equivalence class may have a storage subspace defined by a predetermined number of low bits of the multi-bit memory address. The storage subspaces of the equivalence classes may then be assigned to the disks of the replication group using modulus arithmetic, e.g., [number of equivalence classes] mod [number of disks]. The selected disk of the replication group may thereafter be determined by mapping the base memory address of the splinter to the assigned storage subspaces again using modulus arithmetic. Accordingly, the equivalence class technique may be employed to substantially uniformly distribute the splinters of the transaction over the disks of the replication group.

DESCRIPTION

Figure 1:
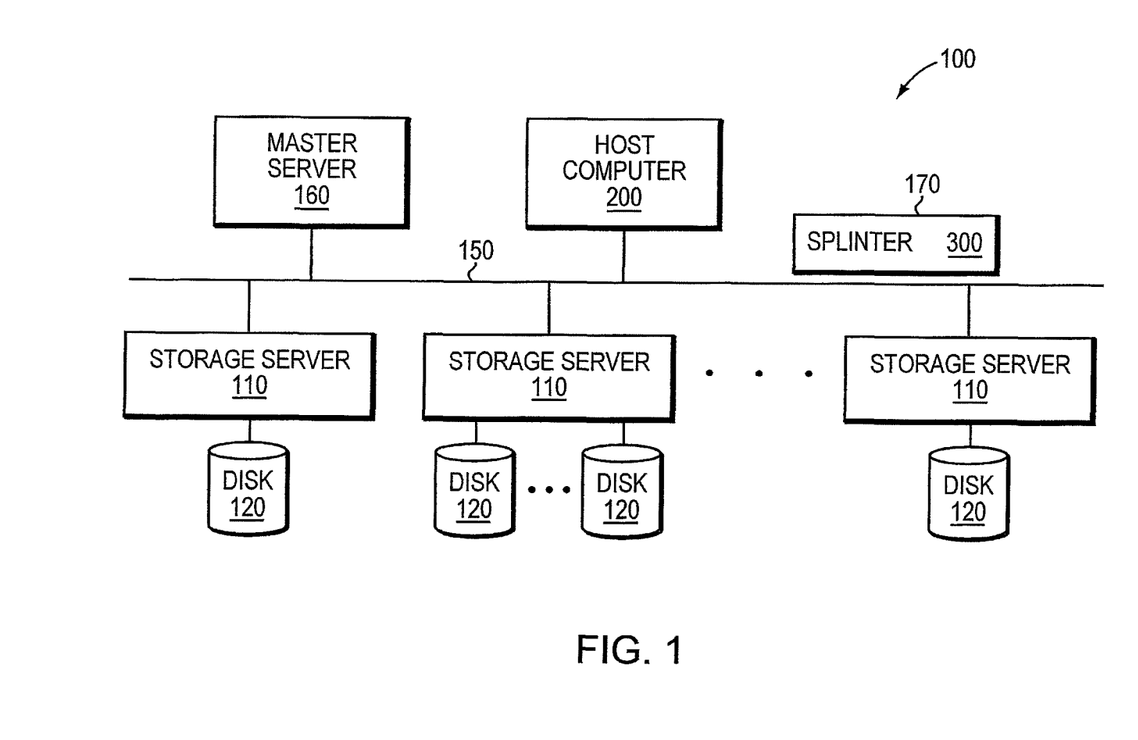
FIG. 1 is a block diagram of a network environment.

FIG. 1 is a block diagram of a network environment 100 that may be advantageously used with one or more embodiments described herein. The environment 100 may include a host computer 200 coupled to a plurality (e.g., a cluster) of storage servers 110 over a computer network 150. The computer network 150 may include one or more point-to-point links, wireless links, a shared local area network, a wide area network or a virtual private network implemented over a public network, such as the well-known Internet, although, in an embodiment, the computer network 150 is illustratively an Ethernet network. The environment 100 may also include a master server 160 configured to manage the cluster of storage servers 110. The master server 160 may be located anywhere on the network 150, such as on host computer 200 or on a storage server 110; however, in an embodiment, the master server 160 is illustratively located on a separate administrative computer.

Each storage server 110 may be embodied as a computer, such as a storage system, storage appliance such as a filer, or a blade running a user level process, configured to provide storage services to the host computer 200. As such, each storage server 110 includes computing and memory elements coupled to one or more storage devices, such as disks 120. The host computer 200 may communicate with the storage servers 110 using discrete messages or splinters 300 contained within frames 170, such as Ethernet frames, that are transmitted over the network 150 using a variety of communication protocols including, inter alia, wireless protocols and/or Ethernet protocols. However, in an embodiment described herein, the frame 170 is illustratively encapsulated within a User Datagram Protocol/Internet Protocol (UDP/IP) messaging protocol.

Figure 2:
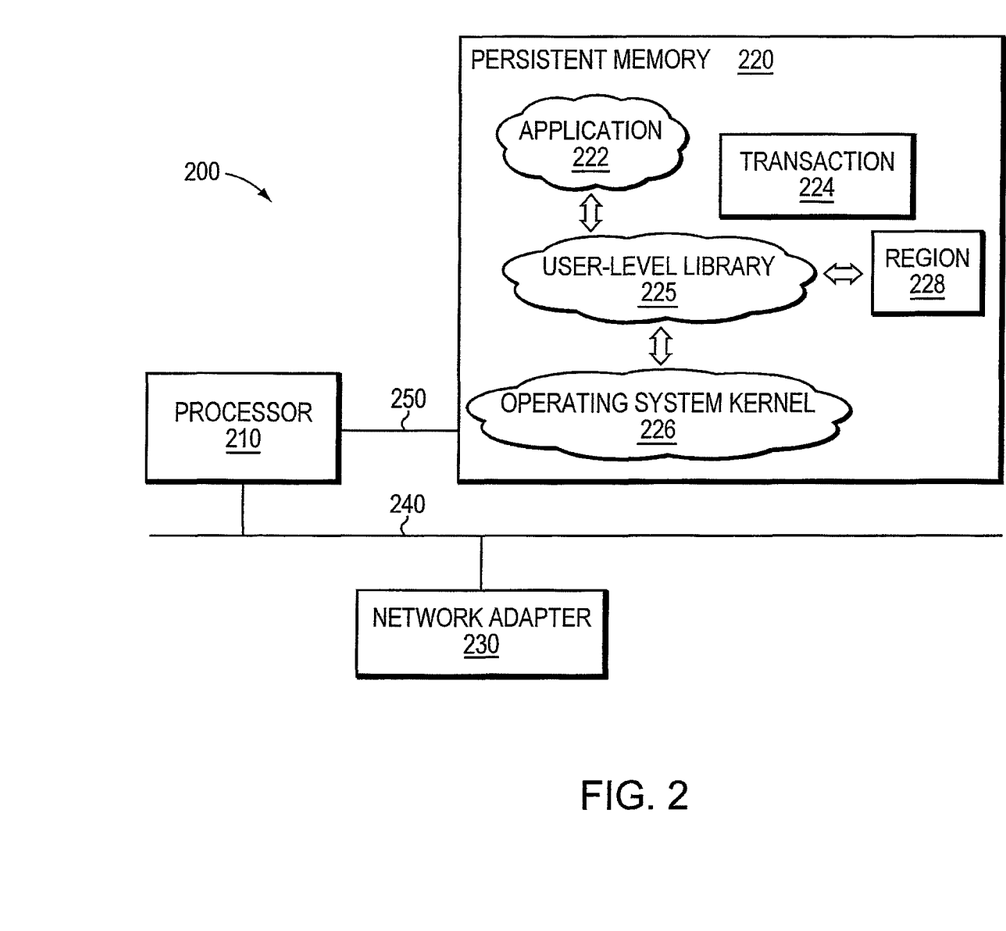
FIG. 2 is a block diagram of a host computer of the network environment.

FIG. 2 is a block diagram of host computer 200 that may be advantageously used with one or more embodiments described herein. The host computer 200 illustratively includes a processor 210 connected to a persistent memory 220 over a memory bus 250 and connected to a network adapter 230 over a system bus 240. The network adapter 230 may include the mechanical, electrical and signaling circuitry needed to connect the host computer 200 to the storage servers 110 over computer network 150. The network adapter 230 may also include logic circuitry configured to transmit frames 170 containing the splinters 300 over the network 150 in accordance with one or more operational modes that replicate information contained in the splinters on the disks 120 of the storage servers 110.

The persistent memory 220 may illustratively be embodied as non-volatile memory, such as storage class memory, having characteristics that include, e.g., byte addressability of data organized as logical constructs, such a file or region 228, in the memory. The byte addressable, persistent memory 220 may include memory locations that are addressable by the processor 210 for storing software programs and data structures associated with the embodiments described herein. The processor 210 may, in turn, include processing elements and/or logic circuitry configured to execute the software programs, such as user-level library 225, and manipulate the data structures, such as transaction 224. An operating system kernel 226, portions of which are typically resident in persistent memory 220 and executed by the processing elements, functionally organizes the host computer by, inter alia, invoking operations in support of one or more applications 222 executing on the computer. Illustratively, the application 222 may be implemented via a process that includes a plurality of threads. It will be apparent to those skilled in the art that other processing and memory means, including various computer readable media, may be used to store and execute program instructions pertaining to the embodiments herein.

As used herein, the region 228 may be a logically contiguous address space that is backed physically with the persistent memory 220. The region 228 may be mapped into an address space of the application (i.e., process) to enable modification, e.g., writing, of the region 228 by the application. Once the region is mapped into the application's address space, the user-level library 225 may control access to the region. That is, the application 222 may read and/or write data stored in the region of the locally attached persistent memory through the library 225. As a result, the user-level library 225 may operate as a control point for accessing the persistent memory 220, thereby circumventing the operating system kernel 226.

In an embodiment, the user-level library 225 may configure the persistent memory 220 as a software transactional memory (STM) system defined by operations, such as a STM commit operation, that ensure safe and consistent storage of data in the region 228 of the persistent memory 220, as well as on one or more disks 120 of the storage servers 110. To that end, the user-level library 225 contains computer executable instructions executed by the processor 210 to perform operations that select a storage server on which to replicate the data. In addition, the library 225 contains computer executable instructions executed by the processor 210 to perform operations that modify the persistent memory 220 to provide, e.g., atomicity, consistency, isolation and durability (ACID) semantics or properties. The ACID properties of the STM system are illustratively implemented in the context of transactions, such as transaction 224, which atomically move data structures (and their associated data) stored in the memory from one correct ACID state to another. The STM system thus enables the application 222 to modify its data of a region 228 in a manner such that the data (e.g., data structure) moves atomically from one safe consistent state to another consistent state in the persistent memory 220.

Illustratively, the library 225 may cooperate with application 222 to control access to the data stored in the region of the persistent memory 220 as transaction 224 using the STM commit operation. In an embodiment, the application (i.e., thread) may initiate the transaction 224 by assembling all elements (data) that it intends to write for that transaction; this is referred to as a read/write (r/w) set of the transaction. For example, assume that the transaction 224 involves inserting a new node into a doubly-linked list within region 228. In accordance with the byte addressability property of the persistent memory 200, the application may render small, random modifications or changes to the data; to that end, the elements of the r/w set that the application intends to write (change) may include a previous pointer, a next pointer, and a new node, thereby resulting in approximately 50 bytes of changed data. The application 222 may then cooperate with the user-level library 225 to execute the transaction in accordance with the STM commit operation. Successful execution of the commit operation (and the transaction) results in changing every element (datum) of the write set simultaneously and atomically, thus ensuring that the contents of the persistent memory are safe and consistent. Notably, within the context of the transaction 224, the library 225 may precisely determine which bytes of the data have changed within the region 228, as well as how and when the data bytes have changed. Armed with precise knowledge of the context of the transaction, the library 225 may efficiently replicate (i.e., copy) the changed data at the granularity at which it was modified, e.g., at the byte-addressable granularity.

Figure 3:
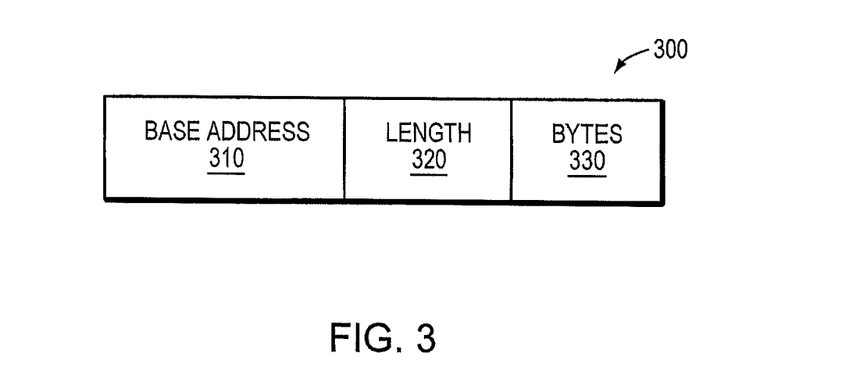
FIG. 3 is a block diagram of a splinter.

In one or more embodiments, the library 225 may initiate replication of the data by forwarding the changed data to network adapter 230 of host computer 200 as one or more splinters 300 associated with the transaction 224. FIG. 3 is a block diagram of a splinter 300 that may be advantageously used with one or more embodiments described herein. Illustratively, splinter 300 may contain information such as a starting or base memory address 310 of the changed data within the region, a length 320 of the changed data and a string of bytes 330 of the changed data. Notably, the splinters 300 are created at the granularity of the actual individual bytes of data that are written. For example, referring to the node insertion transaction described above, three (3) splinters containing the changed data are illustratively created by the library and forwarded to the adapter in the context of transaction 224: a first splinter containing the base memory address, length and bytes of the next pointer; a second splinter containing the base memory address, length and bytes of the previous pointer, and a third splinter containing the base memory address, length and bytes of the newly inserted node. Replicating changed data at the byte-addressable granularity represents a substantial cost savings because time and computing resources, such as network bandwidth and network buffer space, are not wasted on replicating (copying) data that has not changed. Assume, for example, that changes or updates to the previous pointer and the next pointer, as well as writing of the new node may result in approximately 50 bytes of data. Therefore, instead of copying 12 kB of data in accordance with a previous page-based node insertion algorithm, the library 225 need only copy 50 bytes of data.

The network adapter 230 may thereafter forward each splinter 300 over computer network 150 to one of the plurality (cluster) of remote storage servers 110 having disks 120 organized as a replication group for the region. In an embodiment, the splinter 300 may be created by the library 225 in the context of the STM commit operation and forwarded over the network 150 in accordance with a synchronous mode of replication. Here, the splinter is loaded (possibly individually) into a frame 170, processed by a network protocol stack of the operating system kernel 226 and promptly transmitted by the network adapter 230 over the network 150 to a storage server 110 serving a selected disk 120 of the region's replication group. According to the synchronous mode of replication, the library 225 may wait for a response from the storage server (e.g., indicating that the splinter was successfully stored on the selected disk) before the STM commit operation for the transaction completes (returns). Therefore when the commit returns, a successful transaction may be guaranteed to be replicated, meaning that all splinters in the transaction have been replicated (or none of them have been replicated). Illustratively, a 2-phase commit protocol may be employed such that if replication fails, the transaction fails and the failure (error) is propagated to the application (via the library).

Figure 4:
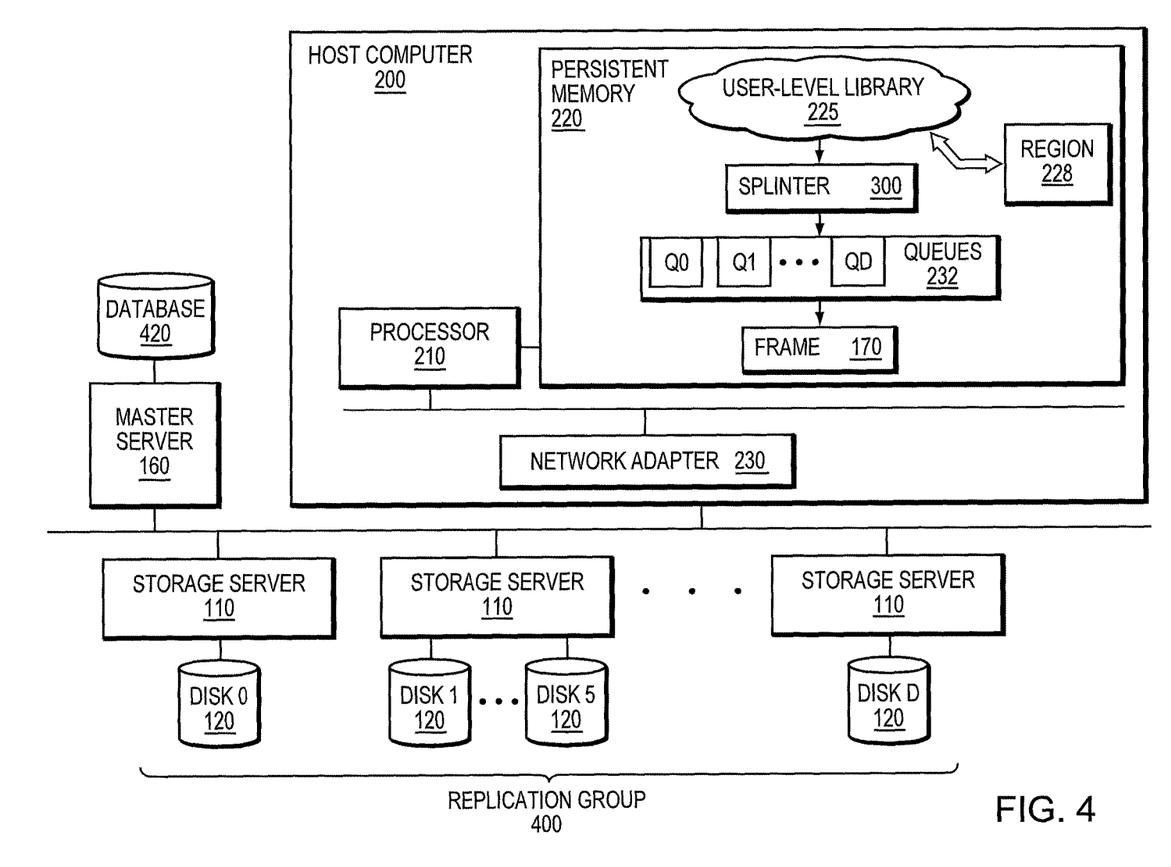
FIG. 4 is a block diagram of a replication group.

FIG. 4 is a block diagram of a replication group 400 that may be advantageously used with one or more embodiments described herein. The replication group 400 is associated with region 228 and may be organized by, e.g., assignment of a predetermined number of disks 120 attached to a number of remote storage servers 110. The assignment of disks to the replication group is illustratively performed by the master server 160. In one embodiment, the number of storage servers 110 included within the replication group 400 may equal the number of disks assigned to the replication group, such that each storage server 110 serves one disk 120. In other embodiments, the number of storage servers may not equal the number of disks of the replication group, such that one storage server 110 may serve more than one disk 120; illustratively, these latter embodiments are dependent upon the bandwidth available to the server/disks. Notably, the splinters 300 of transaction 224 are subsumed within the region 228 and are distributed substantially uniformly over the disks 120 of the replication group 400.

In one or more embodiments, selection of disk 120 within the replication group 400 to store the splinter 300 may be determined in accordance with an equivalence class technique. Illustratively, the equivalence class technique may logically apportion an address space of the region 228, as defined by a multi-bit memory address, into a number of equivalence classes defined by a predetermined number of high bits of the multi-bit memory address. In addition, each equivalence class may have a storage subspace defined by a predetermined number of low bits of the multi-bit memory address. The equivalence classes may then be mapped to the disks 120 of the replication group 400 using modulus arithmetic, e.g., [memory address] mod [number of equivalence classes], where the number of equivalence classes is greater than or equal to the number of disks. The mapping results in assignment of a plurality of subspaces per disk, illustratively in a round-robin manner, such that each storage server 110 is responsible for a disjoint subset of equivalence classes. The proportion of subspaces that a storage server is assigned may be directly proportional to the number of disks that it contributes to the replication group 400. The union of the subspaces served by the storage servers is therefore a complete image of the region 228.

The selected disk of the replication group 400 may thereafter be determined by mapping the base memory address 310 of the splinter 300 to the assigned storage subspaces of the disks again using modulus arithmetic. Here, the low address bits n are ignored when calculating the modulus. The remaining number m of high address bits is used to map the splinter to the selected disk by taking the modulus of the remaining high address bits with respect to the number of equivalence classes. The mapping results in forwarding of the splinter 300 to the selected disk 110 based on the subspace assigned to the disk. Illustratively, the persistent memory 220 may include a plurality of queues 232 configured to store the splinter 300 prior to forwarding of the splinter 300 to the network adapter 230 as, e.g., frame 170. In an embodiment, the number of queues 232 may equal the number of disks assigned to the replication group 400, such that each queue 0-D is associated with a corresponding disk 0-D of the replication group. Accordingly, the library 225 may illustratively organize the queues 232 according to the disks 120 of the replication group 400.

For example, assume that the replication group is assigned a predetermined number d of disks, wherein d is illustratively 10, such that there are 10 disks per replication group. Assume further that that a predetermined number of equivalence classes c is selected such that the number of disks is less than or equal to the number of equivalence classes (i.e., c≥d). Also assume that the multi-bit memory address is illustratively a 32-bit memory address (i.e., a pointer) and that the region has a 32-bit address space (e.g., as defined by the 32-bit memory address pointer). A predetermined number n of low memory address bits, wherein n is illustratively 20, is used to create a sub-address space ("subspace") having a capacity of $2^n$ (i.e., $2^{20}$) or 1 MB. The remaining number m of high memory address bits, wherein m is illustratively 12, is used to create r (i.e., $2^{12}$) or 4096 (4 k) sub-spaces distributed over the c number of equivalence classes. That is, 4096 ($2^{12}$) sub-spaces each 1M ($2^{20}$) in size are distributed, e.g., uniformly, over the c number of equivalence classes. According to the technique, the distribution of sub-spaces across the equivalence classes may be achieved uniformly by using modulus arithmetic such that subspace x is in equivalence class y if and only if x mod c=y, i.e., [m high memory address bits] mod [c number of equivalence classes]=mapped equivalence class; for example, 4095 (a subspace number of the 4096 subspaces numbered 0 to 4095) mod 10 (number of equivalence classes)=5 (equivalence class number), so that subspace number 4095 maps to equivalence class number 5. The mapping results in an initial assignment of approximately 410 1 MB subspaces per disk (i.e., 6 disks×410 subspaces+4 disks×409 subspaces=4096 subspaces across 10 disks, in the above example where c=d=10). The selection of the disk (as well as the queue 232) to receive the splinter 300 may be determined in a manner similar to mapping of the subspaces to the equivalence classes, i.e., [equivalence class number] mod [number of disks], where the number of disks is less than or equal to the number of equivalence classes (i.e., c≥d); for example, equivalence class number 5 maps to disk number 5, i.e., 5 (equivalence class number) mod 10 (number of disks)=5 (disk number).

According to the technique described herein, each splinter of a transaction is transmitted to one storage server and stored on one disk of the region's replication group. Yet, the splinters of the transaction may be transmitted to different storage servers attached to the disks of the replication group. In other words, the splinters 300 carrying the changed data (updates) associated with a single transaction, such as transaction 224, may be split up and loaded into different queues 232, and forwarded to different disks 120 of possibly different storage servers 110. For example, refer again to the node insertion transaction described above where three (3) splinters are created by the user-level library 225. A disk of the replication group associated with the region is selected by taking the modulus of the base address of each splinter. Thus, the 3 splinters may be transmitted to 3 different disks because each disk has responsibility for a disjoint subset (subspace) of the region's address space. As a result, each frame 170 may be destined to one storage server (i.e., one disk) and the frame may be loaded with one or more splinters having base addresses within the disk's assigned storage subspace. The equivalence class technique therefore provides uniform distribution of the splinters 300 of the transaction 224 over the disks 120 of the replication group 400.

In an embodiment, the master server 160 may include a memory configured to store computer executable instructions executed by a processor to perform operations needed to manage the cluster of storage servers, including formation and management of the replication group 400. To that end, the master server 160 maintains a storage repository, such as a database 420, of all storage servers and their attached disks within the cluster. Illustratively upon start-up or boot, a storage server 110 may broadcast a message over the network 150 that attempts to locate the master server 160. The master server may respond to the message by providing its location to the storage server. The storage server may then reply with certain characterizing parameters, e.g., an amount of (persistent) memory in the server, a number of disks attached to the server, and available storage capacity of the disks. Over time, the master server thus accumulates database 420 of all the storage servers on the network constituting the cluster.

The master server 160 may also cooperate with the library 225 to replicate data changed in the region 228 of the persistent memory 220. For example, in response to application 222 creating region 228, the library 225 may contact the master server 160, which assembles replication group 400 for the region. Illustratively, the master server may assemble the replication group by assigning disks to the group in a manner that, e.g., matches the bandwidth of each disk 120 with the bandwidth of the network adapter 230 (and network 150) regardless of whether that requires one storage server or multiple storage servers. The master server 160 may then record information (such as the disks and their attached storage servers constituting the replication group) in database 420 and inform the library 225 as to which disks of the storage servers constitute the region's replication group. Thereafter, in response to changes to the data of the region, the library 225 may select a disk of the replication group to replicate the changed data by implementing the equivalence class technique described herein. Notably, each region within persistent memory 220 of host computer 200 has an associated replication group 400.

Figure 5:
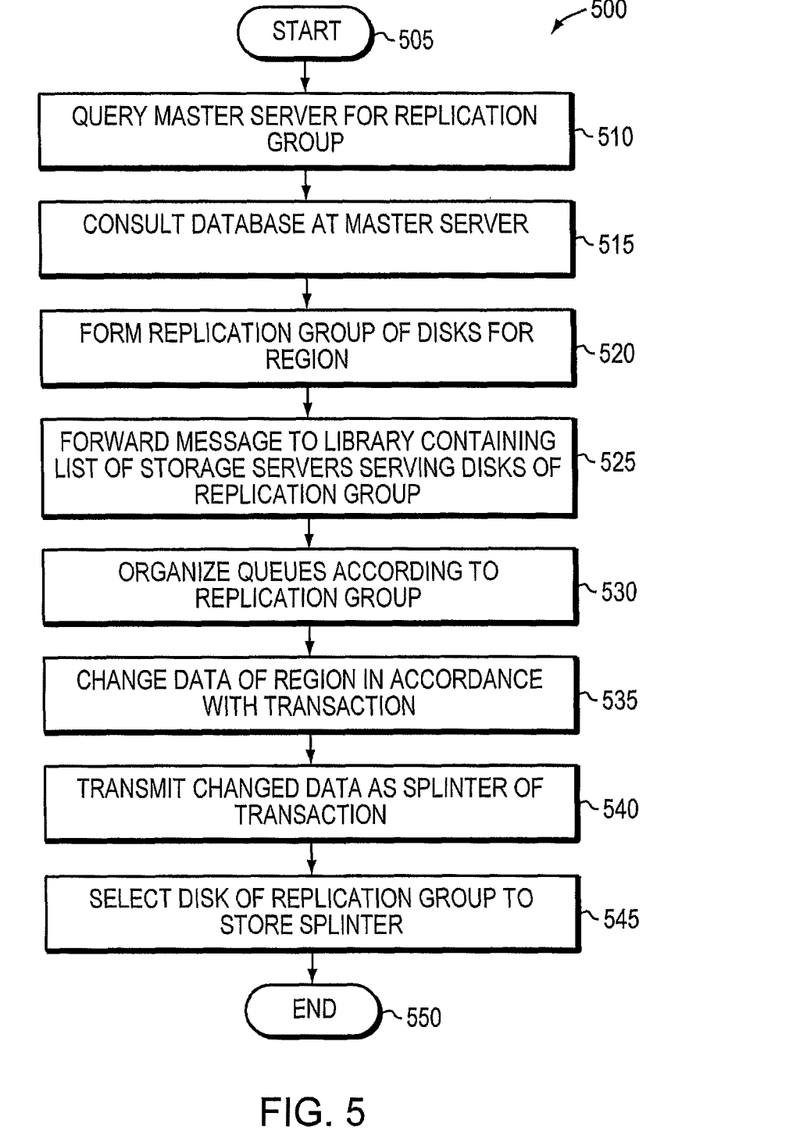
FIG. 5 is an example simplified procedure for replicating data stored in a byte-addressable, persistent memory of the host computer.

FIG. 5 is an example simplified procedure for replicating data stored in a byte-addressable, persistent memory of a host computer in a network environment that may be advantageously used with the embodiments described herein. The procedure 500 begins at step 505 and proceeds to step 510 where the library queries the master server for a replication group in response to the application creating the region. At step 515, the master server consults its database and, at step 520, forms a replication group of disks for the region, as described herein. At step 525, the master server forwards a message to the library containing a list of storage servers serving the disks of the replication group. At step 530, the library organizes (arranges) the queues according to the disks of the replication group. At step 535, the application modifies (changes) data of the region in accordance with a transaction and, at step 540, the library cooperates with the network adapter to initiate replication of the changed data by transmitting the changed data over the network as one or more splinters associated with the transaction. At step 545, a disk of the replication group is selected to store the splinter (carried within a frame) in accordance with the equivalence class technique described herein to thereby replicate the changed data. The procedure then ends at step 550.

Advantageously, the remote storage servers 110 may be configured to store off-host, redundant copies of the data on disks 120, which data is primarily stored in persistent memory 220. These off-host, redundant copies of the stored data are illustratively used for disaster recovery deployments. When deployed as such, the use of disks is economically attractive, thereby enabling, e.g., petabytes of secondary, backing storage on the disks of the remote storage servers in support of terabytes of primary storage on persistent memory 220 in the host computer.

While there have been shown and described illustrative embodiments for efficiently replicating data stored in a byte-addressable, persistent memory of a host compute in a network environment, it is to be understood that various other adaptations and modifications may be made within the spirit and scope of the embodiments herein. For example, embodiments have been shown and described herein with relation to a synchronous mode of replication. However, the embodiments in their broader sense are not so limited, and may, in fact, allow the information contained with the splinter of the transaction to be stored on a disk of the replication group using an asynchronous mode of replication. Illustratively, the asynchronous mode separates the STM commit operation from replication, i.e., returning from the commit operation has no bearing on whether replication has succeed. Here, the commit operation merely ensures that the splinter is loaded on an appropriate queue to continually pack a frame, e.g., an Ethernet frame, with other splinters destined to the selected disk of the replication group to optimize for bandwidth. In other words, the asynchronous mode is configured to wait until the frame is filled with the splinters before transmitting the frame over the network to the selected disk, thereby substantially increasing throughput of the system. A completion notification for the replication may be subsequently returned once the storage server responds (e.g., indicating that the splinters in the frame were successfully stored on disk).

The foregoing description has been directed to specific embodiments. It will be apparent, however, that other variations and modifications may be made to the described embodiments, with the attainment of some or all of their advantages. For instance, it is expressly contemplated that storage class memory as described herein may be selected from, among others: SONOS Flash, Nanocrystal Flash, Feroelectric RAM (FeRAM), Magnetic RAM (MRAM), Phase-Change RAM (PCRAM), Resistive RAM (RRAM), Solid Electrolyte RAM, and Polymer/Organic RAM.

It is equally contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   a cluster of storage servers coupled to a network, the storage servers attached to at least one, storage device organized as a replication group; and
   a host computer coupled to the cluster of storage servers over the network, the host computer including a processor connected to a storage class memory (SCM), the processor configured to execute an operating system kernel, an application and a user-level library stored in the SCM, the user-level library cooperating with the application to control access to data stored in a region of the SCM and to change the data of the region at a byte-addressable granularity, the user-level library replicating the changed data of the region to the replication group, the user-level library configured to:
      define a storage subspace based on a predetermined number of low bits of a multi-bit memory address of an address space of the region;
      assign the storage subspace to the at least one storage device of the replication group; and
      select the at least one storage device of the replication group to receive the changed data to enable replication of the changed data at the byte-addressable granularity.

2. The system of claim 1 wherein a logically contiguous address space of the region of the SCM is mapped into an address space of the application.

3. The system of claim 1 wherein the user-level library is further configured to configure the SCM as a software transactional memory (STM) system to store the data of the region as a transaction.

4. The system of claim 3 wherein the user-level library is further configured to perform operations that modify the SCM to provide atomicity, consistency, isolation and durability (ACID) properties of the STM system.

5. The system of claim 4 wherein the ACID properties are implemented in a context of the transaction to atomically move the data of the region from one consistent state to another consistent state in the SCM.

6. The system of claim 4 wherein the STM system is defined by a STM commit operation to ensure safe and consistent storage of the data in the region as well as on the at least one storage device of the replication group.

7. The system of claim 6 wherein the user-level library further cooperates with the application to control access to the data stored in the region of the SCM as the transaction using the STM commit operation.

8. The system of claim 7 wherein the application is configured to:
   initiate the transaction by assembling elements of the data as a read/write set of the transaction; and
   render small, random modifications to the elements of the set at the byte-addressable granularity of the SCM.

9. The system of claim 8 wherein the application and user-level library are configured to:
   execute the transaction according to the STM commit operation to change each element of the set simultaneously and atomically to ensure that the data of the SCM are safe and consistent.

10. The system of claim 9 wherein the user-level library configured within a context of the transaction is further configured to:
    determine which bytes of the data changed in the region;
    determine how the bytes of the data changed in the region; and
    determine when the bytes of the data changed in the region.

11. The system of claim 10 wherein the user-level library configured within the context of the transaction is further configured to:
    replicate the changed data at the byte-addressable granularity to the replication group.

12. A method comprising:
    organizing at least one storage device attached to a cluster of storage servers as a replication group;
    controlling access to data stored in a region of a storage class memory (SCM) by a user-level library cooperating with an application executing on a processor of a host computer;
    defining a storage subspace based on a predetermined number of low bits of a multi-bit memory address of an address space of the region;
    assigning the storage subspace to the at least one storage device of the replication group;
    changing the data of the region at a byte-addressable granularity; and
    selecting the at least one storage device of the replication group to receive the changed data to enable replication of the changed data at the byte-addressable granularity.

13. The method of claim 12 further comprising:
    configuring the SCM as a software transactional memory (STM) system to store the data of the region as a transaction.

14. The method of claim 13 further comprising:
    performing operations that modify the SCM to provide atomicity, consistency, isolation and durability (ACID) properties of the STM system.

15. The method of claim 14 further comprising:

implementing the ACID properties in a context of the transaction to atomically move the data of the region from one consistent state to another consistent state in the SCM.

16. The method of claim 14 further comprising:

defining the STM system by a STM commit operation to ensure safe and consistent storage of the data in the region as well as on the at least one storage device of the replication group.

17. The method of claim 16 wherein controlling access to the data further comprises:

controlling access to the data stored in the region of the SCM as the transaction using the STM commit operation.

18. The method of claim 17 further comprising:

initiating the transaction by assembling elements of the data as a read/write set of the transaction; and rendering small, random modifications to the elements of the set at the byte-addressable granularity of the SCM.

19. The method of claim 18 further comprising:

executing the transaction according to the STM commit operation to change each element of the set simultaneously and atomically to ensure that the data of the SCM are safe and consistent.

20. A non-transitory computer readable medium including program instructions for execution on a processor, the program instructions configured to:

organize at least one storage device attached to a cluster of storage servers as a replication group;

control access to data stored in a region of a storage class memory by a user-level library cooperating with an application executing on the processor;

define a storage subspace based on a predetermined number of low bits of a multi-bit memory address of an address of the region;

assign the storage subspace to the at least one storage devices of the replication group;

change the data of the region at a byte-addressable granularity; and select the at least one storage device of the replication group to receive the changed data to enable replication of the changed data at the byte-addressable granularity.

* * * * *